United States Patent [19]

Hernandez

[11] 4,180,024

[45] Dec. 25, 1979

[54] INTERNAL COMBUSTION ENGINE FAN ADAPTER

[76] Inventor: Fredrico Hernandez, P.O. Box 1376, Palmdale, Calif. 93550

[21] Appl. No.: 919,965

[22] Filed: Jun. 28, 1978

[51] Int. Cl.² ............................................. F01P 5/12
[52] U.S. Cl. ............................. 123/41.46; 123/41.49; 123/195 A; 74/230.4; 403/3; 403/406
[58] Field of Search ............. 123/41.46, 41.49, 195 A, 123/198 R, 41.65, 41.11, 41.63; 74/230.3, 230.4; 403/3, 4, 406

[56] References Cited

U.S. PATENT DOCUMENTS

| | | | |
|---|---|---|---|
| 3,505,982 | 4/1970 | Walter et al. | 123/41.46 |
| 3,661,237 | 5/1972 | Thompson | 123/41.46 |
| 3,824,807 | 7/1974 | Hecht | 123/41.46 |
| 4,029,423 | 6/1977 | Sager | 403/3 |
| 4,066,048 | 1/1978 | Premus | 123/41.49 |
| 4,074,662 | 2/1978 | Estes | 123/41.46 |

FOREIGN PATENT DOCUMENTS 640236  4/1962  Canada ................................. 123/195 A Primary Examiner—Charles J. Myhre
Assistant Examiner—Jeffrey L. Yates
Attorney, Agent, or Firm—William P. Green

[57] ABSTRACT

An adapter for attaching a radiator cooling fan to a water pump of an internal combustion engine, the adapter having spaced rear and front walls for attachment to the water pump and fan respectively with recesses extending radially into the body of the adapter between these walls for reception of a wrench used in securing the rear wall to the pump, and with these recesses being separated by radial projections securing the front and rear walls together, and with additional openings being provided in the front wall for passing a wrench rearwardly through that wall when necessary. The adapter has a rearwardly opening pilot recess for engaging a pilot projection on the water pump flange, and a forwardly projecting boss structure for centering the fan, which boss structure desirably has two external diameters for engaging fans with different size center openings, and with a spacer being provided for reception about the larger diameter portion of the boss structure to locate a fan having a smaller diameter central opening for proper engagement with the reduced diameter portion of the boss.

12 Claims, 8 Drawing Figures

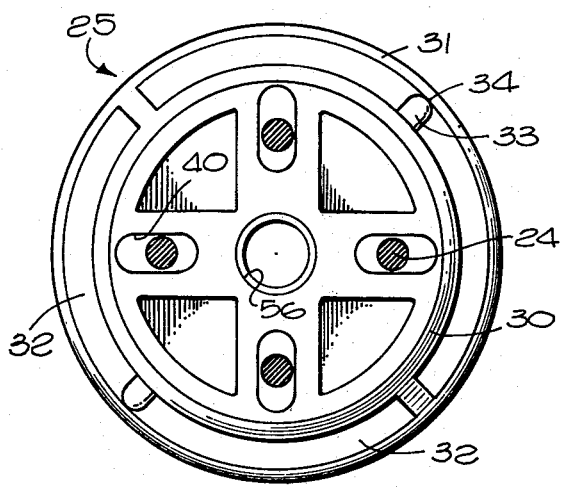
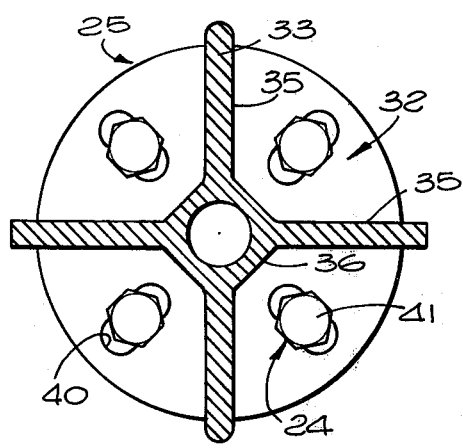
FIG. 5
FIG. 6
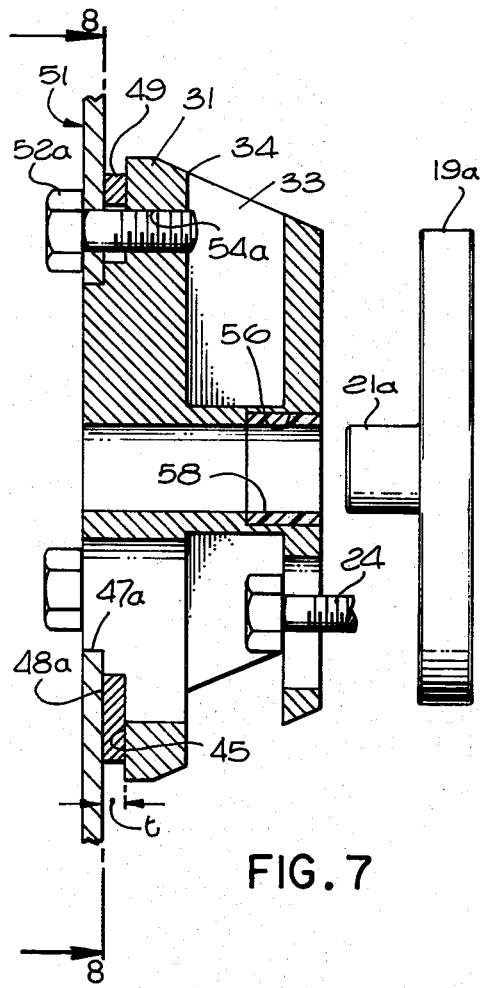
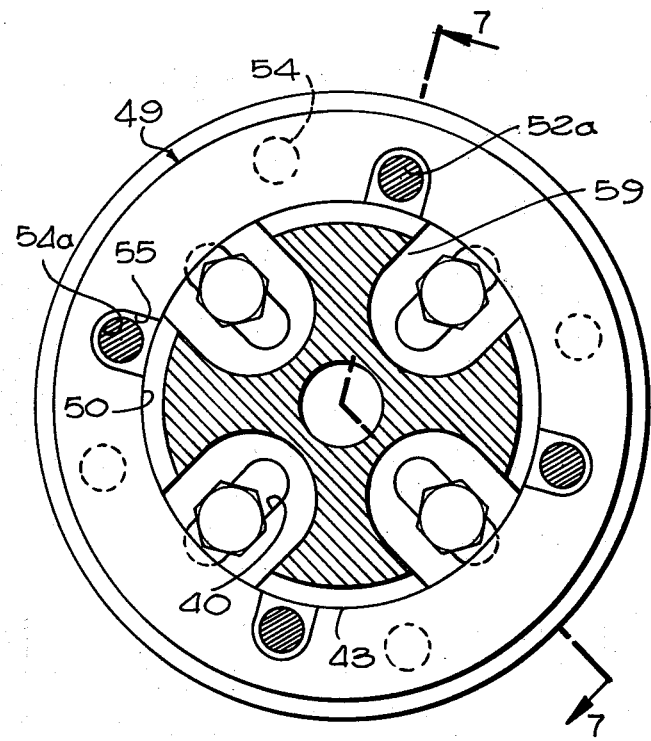
FIG. 7
FIG. 8

INTERNAL COMBUSTION ENGINE FAN ADAPTER

BACKGROUND OF THE INVENTION

This invention relates to improved adapters for attaching a radiator cooling fan of an internal combustion engine to the water pump of the engine.

In performing repair work on the cooling system of an internal combustion engine, it frequently becomes necessary or desirable to insert an adapter unit between the water pump of the engine and the radiator cooling fan driven thereby, in order to assure proper positioning of the fan relative to the radiator. The use of such an adapter may be required, for example, when an automatic temperature responsive fan driving clutch unit has become inoperative and is being removed without replacement. There have in the past been devised various different types of adapters for this purpose, but each has had distinct disadvantages in use. One prior adapter currently on the market consists of an annular body having a rear flange containing radial slits through which bolts extend to secure the body to a water pump, and having a forward flange containing radial slits for attaching a fan thereto, with an annular groove or space being provided between the two flanges. In order to connect the rear flange to the water pump, it is necessary in such a device to insert a wrench radially inwardly into the annular groove in the adapter body, to engage and turn the heads of screws which project rearwardly into a portion of the water pump. However, the depth of the annular groove has been limited by the necessity for provision of a central portion of the body for securing the front and rear flanges together, and because of this depth limitation it has been difficult in many situations to properly engage the head of the bolt with an inserted tool. Consequently, attachment of the adapter to a water pump has required very careful manipulation of a tool in a space which is really not large enough for proper reception of the tool, and has therefore entailed expenditure of an excessive amount of time in the installing process. Further, the central portion of the adapter, between the front and rear flanges, has necessarily been relatively weak, and on occasion has broken under the forces encountered in operation of the mechanism. In addition, though the rear flange in that prior arrangement has been effectively located relative to the water pump by reception of a pilot projection on the pump into a pilot recess in the rear portion of the adapter, the fan itself has not been effectively centered relative to the front flange to which it is connected, and if slightly off-center may produce a great deal of vibration and noise when the fan is turning.

Another type of adapter now on the market includes a body which is reversible so that either of two opposite ends of the body may be connected to the water pump, while the other end is connectable to a fan, with an opening extending through the body for reception of a pilot projection on the water pump in either of the two positions, and with a first set of circularly spaced radial slits being formed in the body for reception of screws used in attaching the body to the water pump, and a second set of radial slits being provided in circularly spaced radially outwardly projecting ears on the body for reception of screws used in attaching the fan to the body. The opposite ends of the adapter body have circular boss portions of two different sizes for engaging and fitting closely within central apertures in fans of two different types, so that when one of the ends of the body faces forwardly it is properly positioned for mounting one type of fan, and when the other end of the body is facing forwardly the device can be used for mounting a second type of fan having a different size internal centering opening. This second discussed prior art adapter structure is in some respects even more difficult to mount than the first mentioned arrangement, being so designed that it is extremely difficult for a wrench to be brought into proper engagement with the attaching bolts to satisfactorily and quickly mount the adapter and fan.

SUMMARY OF THE INVENTION

The present invention provides an improved adapter which is especially constructed to be very easily and quickly connected to both the water pump and fan, with conventional tools, and without difficulty in moving the tools into engagement with the attaching bolts or screws and turning those bolts or screws through a sufficiently large range of movement in all installation environments which may be encountered in the various different types of fan, radiator, and pump installations of conventional engines. Further, an adapter of the present invention has great structural strength, to virtually eliminate any possibility of breakage of the part in use or during installation, and has very positive centering means at both ends of the device for precisely centering the adapter relative to the water pump, and the fan relative to the adapter. Besides these advantages, an adapter of a single size can be used with pump pilot projections and fan centering openings of different sizes, to give it great versatility and minimize the necessity for stocking of different size parts.

Structurally, an adapter embodying the invention includes an adapter body having a rear wall connectable to a flange of the water pump and having a forward wall connectable to the fan, with a plurality of circularly spaced wrench receiving recesses being provided in the body between these rear and front walls and extending radially into the material of the body to permit insertion of a wrench thereinto for turning the heads of bolts used in connecting the rear wall to a water pump flange. Circularly between these recesses, the body of the adapter has partitions which extend radially outwardly to define the recesses and rigidly interconnect the front and rear walls, in a manner giving the body the desired high structural strength, while at the same time permitting the recesses to extend radially inwardly farther than the annular groove in the first prior art device discussed above, all in a manner enabling the desired relatively full engagement of a wrench with the heads of attaching bolts, and permitting adequate angular movement of a wrench when so engaged with one of the bolts.

To further facillitate attachment of the adapter to the water pump, the front wall of the device contains apertures through which a socket wrench or the like can extend rearwardly into engagement with the heads of the attaching bolts, for use when access to the bolts in this manner is preferable and more convenient, as when the radiator has been removed from in front of the fan. Additionally, a centering boss structure is carried on the front of the forward fan-carrying wall of the adapter, and may have portions of two diameters, with a spacer being provided for reception about the larger diameter portion when a fan having the smaller diameter opening is being utilized.

BRIEF DESCRIPTION OF THE DRAWING

The above and other features and objects of the invention will be better understood from the following detailed description of the typical embodiment illustrated in the accompanying drawing in which:

FIG. 5 is a rear view of the adapter taken on line 5—5 of FIG. 4;

FIG. 6 is a transverse section taken on line 6—6 of FIG. 2;

FIG. 7 is a sectional view similar to FIG. 4, but showing use of the adapter with a pilot projection and fan of different size, and taken generally on line 7—7 of FIG. 8; and FIG. 8 is a front view taken on line 8—8 of FIG. 7.

DESCRIPTION OF THE PREFERRED EMBODIMENT

Figure 1:
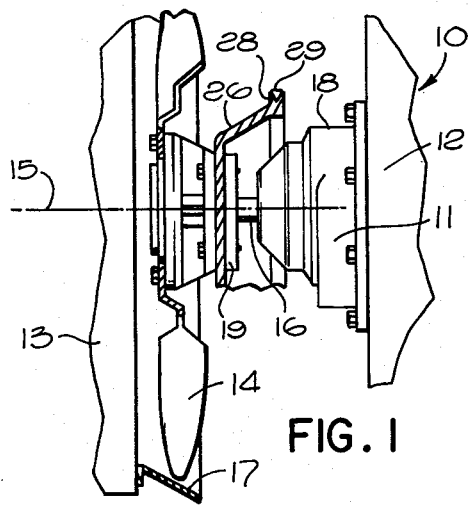
FIG. 1 is a fragmentary side view of an engine having a fan adapter constructed in accordance with the invention.

Referring first to FIG. 1, I have illustrated somewhat diagrammatically and fragmentarily at 10 the forward portion of the conventional piston and cylinder type internal combustion engine, having the usual water pump 11 connected to the forward end of the engine block 12 and acting to pump engine cooling water through the block and through a radiator 13 spaced forwardly thereof. An axial flow fan 14 is driven rotatably about a horizontal axis 15 by the shaft 16 of the water pump, and is positioned in close proximity to the radiator to draw air rearwardly therethrough, with the flow of air being confined and directed by a shroud 17 projecting rearwardly from the radiator and about the fan.

The rotary shaft 16 of water pump 11 projects forwardly from the stationary housing 18 of the pump, and carries a transverse flange 19 (FIG. 2), having a planar forward face 20 disposed transversely of axis 15. An externally cylindrical pilot projection 21 projects forwardly from the center of flange 19 and is centered about axis 15. Four evenly circularly spaced internally threaded apertures 22 (FIG. 4) are formed in flange 19, with the individual axis 23 of these apertures being spaced from but parallel to axis 15, to receive four bolts 24 by which a fan adapter body 25 constructed in accordance with the present invention is secured to flange 19. These bolts also attach to the flange 19 the usual annular pulley element 26, which has a transverse portion 27 clamped tightly between adapter 25 and flange 19, and which forms at its periphery an annular groove 28 within which a V-belt 29 for driving the pump and fan is received.

The adapter body 25 is desirably die cast as a one piece body of an appropriate metal, such as a suitable aluminum alloy. Body 25 is shaped to have a rear wall portion 30 disposed transversely of axis 15 and connectable to flange 19 by the bolts 24, and a forward wall portion 31 also disposed transversely of axis 15 and to which fan 14 is rigidly connected. Axially between these two walls 30 and 31, the adapter body 25 has the cross-section illustrated in FIG. 6, being cut away to form four evenly circularly spaced wrench receiving recesses which open radially outwardly at the periphery of body 25, and which are separated from one another by radial partitions 33 whose outer ends 34 terminate at the periphery of the body. These partitions 33 extend in a front to rear direction between, and are integral with and thus rigidly interconnect the rear and front walls 30 and 31 of adapter body 25. As seen in FIG. 6, the recesses 32 have the cross-sectional configuration approximately of a segment of a circle, being defined in cross-section by two wall surfaces 35 which flare progressively apart and thus give each recess a width which progressively increases as the surfaces 25 advance radially outwardly from the deepest portion 36 of the groove to the periphery of body 25.

The front and rear surfaces 37 and 38 of rear wall 30 of body 25 are planar and disposed transversely of axis 15, as is the rear surface 39 of front wall 31. Rear wall 30 contains four radially elongated slots 40 (FIG. 6), spaced ninety degrees apart about axis 15, and each located midway between the two generally radially extending opposite side surfaces 35 of a corresponding one of the recesses 32. The width of each of these slots 40 corresponds essentially to the diameter of the threaded shanks of screws 24, while the radial length of each slot 40 is considerably greater than the diameter of the threaded shanks of screws 24. The heads 41 of the screws are larger than the width of the slots 40, to bear rearwardly against surface 37 in a manner retaining body 25 against detachment from the water pump. The screw heads 41 are also externally non-circular, and desirably hexagonal, to be engaged and turned by a wrench extending radially inwardly into recesses 32.

Figure 2:
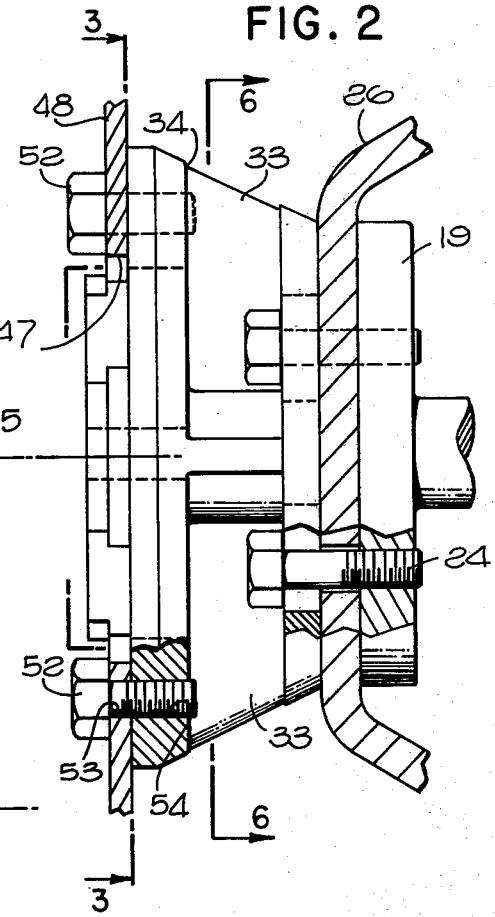
FIG. 2 is an enlarged fragmentary side view of the adapter and connected parts.

At its front side, the forward wall 31 of adapter body 25 forms a fan centering boss structure 42, having a first relatively large diameter external surface 43 centered about axis 15, and a second smaller diameter externally cylindrical surface 44 also centered about axis 15, with a transverse planar forwardly facing surface 45 being formed on wall 31 about the boss structure. At the juncture of the two different diameter surfaces 43 and 44, the front wall 31 of the adapter body forms a second planar forwardly facing surface 46 disposed transversely of axis 15. The diameters of surfaces 43 and 44 correspond to two standard diameters of central openings which are formed in two conventional types of fans currently on the market. In FIG. 2, there is represented at 48 the inner mounting plate portion of one of these types of fan, containing a central opening 47 corresponding to the diameter of surface 43 on the adapter body. FIG. 7 shows at 49 the radially inner mounting portion 48a having a central circular opening 47a of a diameter corresponding to the second smaller diameter centering surface 44 of body 25. For use with such a smaller internal diameter fan, an adapter kit embodying the invention includes an annular spacer 49 (FIG. 7), which has an internal diameter 50 to fit about boss surface 43, and which has an axial thickness t corresponding to the axial thickness of the portion of the boss which carries surface 43, so that when spacer 49 is in position about surface 43, the rear planar surface of the spacer engages axially against surface 45 of body 25, and the forward face of spacer 49 engages the rear planar surface of portion 48a of the fan at 51. This spacer may be molded from an appropriate resinous plastic material, or formed of metal if desired.

When the fan 14 has the larger internal diameter mounting portion 48, this portion is secured to adapter body 25 by four evenly circularly spaced bolts 52, whose threaded shanks extend through openings 53 in fan portion 48 and connect threadedly into internally threaded bores 54 formed in front wall 31 of body 25. The heads of bolts 52 can thus be tightened against portion 48 of the fan to rigidly secure it to body 25. Similarly, portion 48a of this smaller internal diameter type of fan contains openings 53a through which the threaded shanks of bolts 52a extend, with those shanks being connected into a second set of threaded openings 54a formed in front wall 31 of body 25. These openings 54a are slightly closer to axis 15 than are the openings 54. Adapter 49 contains four evenly circularly spaced openings 55 positioned in correspondence with the openings in portion 48a of the smaller internal diameter type of fan and the corresponding threaded openings 54a in body 25, to pass the shanks of the bolts through the adapter when in use.

Figure 4:
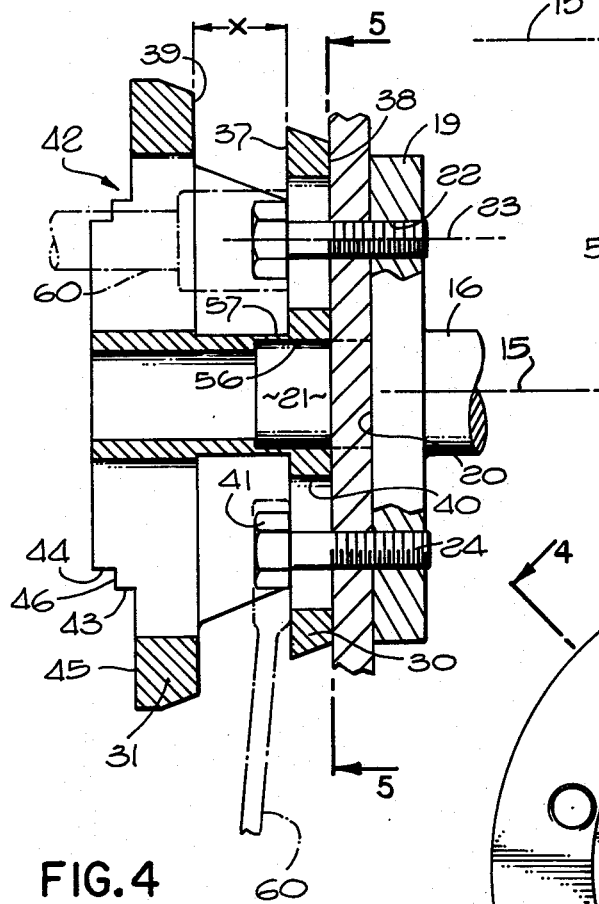
FIG. 4 is a transverse sectional view of the adapter taken on line 4—4 of FIG. 3.

At its rear end, body 25 contains a central cylindrical bore 56, of an internal diameter to closely receive and confine pilot projection 21 in accurately centering relation, with a smaller diameter bore 156 being provided in front of bore 56. As seen in FIG. 4, the pilot recess 56 projects forwardly farther than the front surface 37 of back wall 30 of the body, so that for a portion of the axial length x of recesses 32 (typically almost one-half of that dimension x), pilot recess 56 is located directly radially inwardly of recesses 32. To provide some wall thickness at the locations 57 of FIG. 4, radially between the pilot recess 56 and the innermost extremities 36 of recesses 32, the minimum radial distance of the innermost portions 36 of recesses 32 from axis 15 is somewhat greater than the radius of the cylindrical wall surface of pilot recess 56.

Most water pumps currently on the market have pilot projections such as that shown at 21 which have one of two standard external diameters. The diameter of bore 56 in body 25 corresponds to the larger of these two pilot projection diameters, as represented in FIG. 4. When the water pump to which the adapter is being connected has a pilot projection of the smaller standard size, as represented at 21a in FIG. 7, a tubular internally and externally cylindrical bushing or spacer such as that shown at 58 is employed, with this spacer having an external diameter to fit closely within bore 56 of body 25, and having an internal diameter to closely receive and engage in centering relation the smaller diameter pilot projection 21a.

At locations directly forwardly of the radial slots 40 in rear wall 30 of adapter body 25, the front wall 31 of that adapter body contains four evenly circularly spaced openings 59 (FIG. 3), which interrupt the boss structure 42 and the outer surfaces 43 and 44 of that boss structure, and which have a width w (in a direction essentially circularly about axis 15) substantially greater than that of the individual slots 40 and the heads 41 of the bolts which extend through those slots. The dimension r of openings 59 in a direction radially of axis 15 is also desirably greater than the corresponding radial length of slots 40. Both of these dimensions w and r are large enough to allow extension of a socket wrench rearwardly through these openings 59 and into engagement with the heads 41 of bolts 24, in many of various different positions to which those bolts may be moved radially within slots 40, to enable the bolts to be tightened from the front side of the adapter body (before attachment of the fan to the adapter body).

The adapter parts of the present invention are to be sold as a kit including the adapter body 25, spacer 49, bushing 58, and four screws 52 for securing the fan to body 52. The screws 41 may also be supplied with the kit, but will normally be present on the flange 19 of the water pump.

Figure 3:
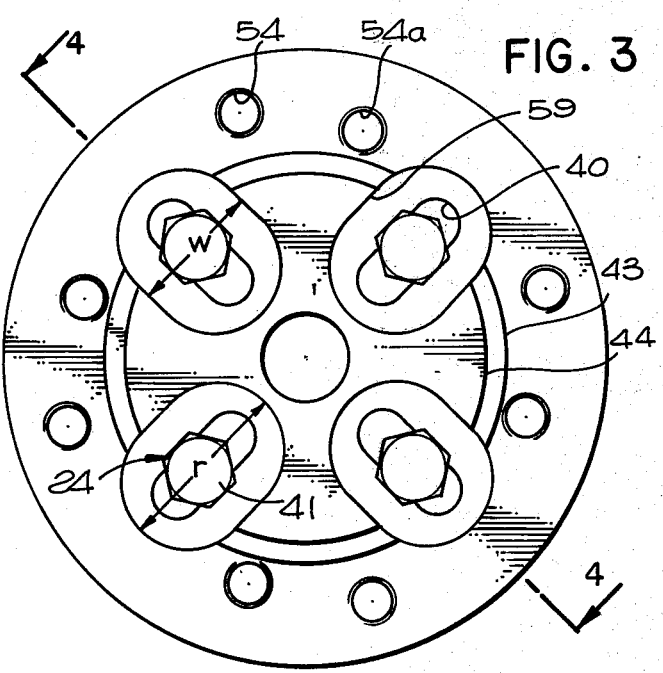
FIG. 3 is a front view taken on line 3—3 of FIG. 2.

Assuming first that the water pump flange has the larger diameter pilot projection as represented in FIG. 3 at 21, and the fan 14 has the larger diameter internal opening as also represented in FIG. 3, and assuming that the original equipment connection initially provided between the water pump and fan has been removed, the first step in installation of the adapter and fan may be to position the portion 48 of the fan about the larger diameter surface 43 of the boss structure 42, and then secure the fan to the adapter body by connection of bolts 52 through the fan and into threaded bore 54 in the front wall of the adapter body. The adapter body and fan can then be moved into position in front of the flange 19 of the water pump, and about the pilot projection 21, to thus be effectively centered relative thereto, after which screws 34 can be inserted through slots 40 and through openings in portion 27 of pulley element 26, to then be connectable threadedly into openings 22 in flange 19. The radial elongation of slot 40 enables these screws to fit into threaded bores 22 formed at any of various different radial distances from axis 15. These bolts can be tightened by inserting an open end or box end wrench radially into each of the recesses 32, (as represented in broken lines at 60 in FIG. 4), and swinging the wrench as necessary to tighten each of the bolts. The rigidity and strength given to the body by virtue of the provision of radial partitions 33 between the various wrench receiving recesses 32 enables the innermost portions 36 of those recesses to extend radially inwardly far enough to assure adequate room for engagement of a wrench with the bolt heads in all positions to which the bolt can be moved.

If the water pump has the smaller diameter pilot projection represented at 21a in FIG. 7, the bushing 58 is inserted into bore 56 as previously discussed. Also, if the fan is of the type having the smaller diameter opening 47a, spacer 49 is placed about the boss structure 42 before the fan is connected to the adapter body.

If the radiator 15 has been removed from the engine, the adapter body 25 is first attached to the water pump, and the fan is then connected to the adapter body. In this instance, the bolts 24 may be very rapidly tightened by insertion of a socket wrench rearwardly through openings 59 in front wall 31 of body 25, as represented in broken lines at 61 in FIG. 3. This wrench may be motor driven through an automatic torque controlling slip clutch device to facilitate quick mounting of body 25 on the water pump. After such attachment of body 25, the fan may be moved into position and secured to the adapter body by bolts 52, still before the radiator is reinstalled.

In some situations, the space problems may be such as to call for use of a socket wrench inserted through front openings 59 even when the radiator is in place, or to render it advisable to use wrenches as shown at 60 when the radiator is removed. In any event, the illustrated kit assembly permits great versatility in selection of mounting procedures, with minimization of installation time required while at the same time attaining great strength in the ultimate assembly and extremely accurate but easily and rapidly attained centering of the fan relative to the water pump shaft.

If it is known at the time of manufacture of the adapter that it is to be used with a particular size fan and a particular size water pump pilot projection, as for instance when the adapter is to be installed as original equipment on a certain automobile, the adapter may be formed with only a single properly dimensioned fan locating surface at its forward end such as that shown at 43 in FIG. 4 for example, omitting the second alternately usable centering surface 44; and similarly the bushing 58 of FIG. 7 may be omitted, with the bore through the adapter being drilled at a proper diameter to receive and engage the water pump pilot projection 21 or 21a.

Though a typical embodiment of the invention has been shown and described in detail, it will of course be understood that the invention is not to be considered as limited to this particular form, but includes in addition all variations falling within the scope of the appended claims.

I claim:

1. An adapter for attaching a radiator cooling fan to a water pump of an internal combustion engine for rotation therewith about an axis, comprising:

an adapter body having a rear wall to be connected to a flange of said water pump and having a front wall spaced forwardly of the rear wall and to which said fan is connectable;

said rear wall containing openings spaced circularly about said axis for reception of bolts securing the body to said water pump flange;

said body containing a rearwardly opening central pilot recess into which a pilot projection carried by said water pump flange projects in centering relation;

said front wall having a forwardly projecting centering boss receivable in centering relation within an opening in the fan;

said body containing a plurality of circularly spaced wrench receiving recesses which extend radially inwardly thereinto between said front and rear walls and are defined at their front and rear sides by said walls and into which a wrench can extend to engage and turn heads of said bolts securing said rear wall to the water pump flange;

said body forming a plurality of circularly spaced partitions which extend radially outwardly between said wrench receiving recesses and separate them one from another and which rigidly connect said front and rear walls together at circularly spaced locations.

2. An adapter as recited in claim 1, in which each of said wrench receiving recesses extends radially inwardly into close proximity to said central pilot recess, and is separated therefrom by a thin inner wall of the recess, said recesses in transverse section being shaped essentially as segments of a circle to have progressively increasing width as the recesses advance radially outwardly.

3. An adapter as recited in claim 1, in which said openings in said rear wall are slots spaced circularly about said axis and elongated radially of the axis.

4. An adapter as recited in claim 1, in which said front wall contains openings which are located axially opposite and directly forwardly of said openings respectively in said rear wall and through which a socket wrench is insertable past the front wall and into engagement in said wrench receiving recesses with the heads of said bolts to turn the bolts.

5. An adapter as recited in claim 1, in which said openings in said rear wall are slots spaced circularly about said axis and elongated radially of said axis, said front wall containing openings directly forwardly opposite said rear wall openings respectively and which are larger both radially and circularly than said rear wall openings, and through which a socket wrench is insertable to positions within said wrench receiving recesses to engage and turn the heads of said bolts.

6. An adapter as recited in claim 1, in which said front wall contains circularly spaced apertures which interrupt said boss at circularly spaced locations directly forwardly opposite said openings in the rear wall and through which a wrench is insertable into engagement with the heads of said bolts.

7. An adapter as recited in claim 1, in which said boss has a first portion with an outer relatively large diameter circular surface receivable in centering relation within a correspondingly dimensioned large diameter opening in a fan, and has a second portion projecting forwardly of said first portion with an outer circular surface of a smaller diameter for engaging and centering a smaller opening in a fan.

8. An adapter as recited in claim 1, in which said boss has a first portion with an outer relatively large diameter circular surface receivable in centering relation within a correspondingly dimensioned large diameter opening in a fan, and has a second portion projecting forwardly of said first portion with an outer circular surface of a smaller diameter for engaging and centering a smaller opening in a fan, said adapter including a spacer removably receivable about said first larger diameter portion of said boss and having a thickness corresponding to said first portion of the boss to space a fan forwardly for engagement with said smaller diameter portion of the boss.

9. An adapter as recited in claim 8, in which said front wall contains a first set of threaded openings spaced circularly about said axis and into which bolts are connectible to secure a fan received about said first portion of the boss to said front wall, and a second set of threaded openings into which bolts extending through a fan having a smaller diameter opening and through apertures in said spacer are connectible.

10. An adapter as recited in claim 9, in which said front wall of said body contains openings which are larger than said openings in a rear wall and which interrupt circularly both of said portions of said boss, and through which a socket wrench is insertable to turn the heads of bolts extending through said openings in the rear wall.

11. An adapter as recited in claim 10, in which said openings in said rear wall are radially extending elongated slots, and said openings in said front wall have radial dimensions greater than their circular dimensions.

12. An adapter as recited in claim 11, including a tubular bushing removably receivable within said pilot recess and having an internal diameter corresponding to a standard size smaller pilot projection on a water pump flange.

* * * * *